United States Patent
Hiemer et al.

(10) Patent No.: US 10,359,111 B2
(45) Date of Patent: Jul. 23, 2019

(54) CONTROL DEVICE FOR AN INFINITE HYDROSTATIC MECHANICAL POWER SPLIT TRANSMISSION

(71) Applicant: ZF Friedrichshafen AG, Friedrichshafen (DE)

(72) Inventors: Marcus Hiemer, Meckenbeuren (DE); Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 24 days.

(21) Appl. No.: 15/714,345

(22) Filed: Sep. 25, 2017

(65) Prior Publication Data

US 2018/0087663 A1 Mar. 29, 2018

(30) Foreign Application Priority Data

Sep. 26, 2016 (DE) ........................ 10 2016 218 404

(51) Int. Cl.

| | |
|---|---|
| *F16H 61/4017* | (2010.01) |
| *F16H 47/02* | (2006.01) |
| *F16H 61/478* | (2010.01) |
| *F16H 59/18* | (2006.01) |
| *F16H 59/70* | (2006.01) |
| *F16H 59/68* | (2006.01) |
| *F16H 59/02* | (2006.01) |

(52) U.S. Cl.
CPC ......... *F16H 61/4017* (2013.01); *F16H 47/02* (2013.01); *F16H 61/478* (2013.01); *F16H 59/18* (2013.01); *F16H 59/70* (2013.01); *F16H 2059/0221* (2013.01); *F16H 2059/6838* (2013.01); *F16H 2059/704* (2013.01)

(58) Field of Classification Search
None
See application file for complete search history.

(56) References Cited

U.S. PATENT DOCUMENTS

| | | | | |
|---|---|---|---|---|
| 5,937,729 | A | * | 8/1999 | Spiess ................ F16H 61/12 474/18 |
| 8,286,748 | B2 | | 10/2012 | Takahashi et al. |
| 8,607,919 | B2 | | 12/2013 | Shirao et al. |
| 8,843,285 | B2 | | 9/2014 | Gratton et al. |
| 9,002,595 | B2 | | 4/2015 | Davis et al. |

(Continued)

FOREIGN PATENT DOCUMENTS

| | | |
|---|---|---|
| DE | 103 56 462 A1 | 7/2005 |
| DE | 112010003541 T5 | 10/2012 |

(Continued)

OTHER PUBLICATIONS

German Search Report issued in corresponding German Patent Application No. 10 2016 218 404.0 dated Jun. 27, 2017.

*Primary Examiner* — Justin Holmes
(74) *Attorney, Agent, or Firm* — Davis & Bujold PLLC; Michael J. Bujold

(57) ABSTRACT

A device for controlling a gear ratio of a hydrostatic mechanical power-split transmission comprises an input switch (1) which, when rotated, produces a particular transmission characteristic and, at the same time, limits the maximum pressure. The selected position of the input switch (1) selects a particular maximum pressure curve from a large number of stored maximum pressure curves.

11 Claims, 9 Drawing Sheets

(56) References Cited

U.S. PATENT DOCUMENTS

| | | | | |
|---|---|---|---|---|
| 2006/0058126 A1* | 3/2006 | Faust | ..................... | F16H 55/56 |
| | | | | 474/8 |
| 2008/0208421 A1* | 8/2008 | Frasch | ................ | F16H 61/0403 |
| | | | | 701/54 |
| 2009/0064675 A1* | 3/2009 | Dvorak | ............... | F16H 61/4017 |
| | | | | 60/464 |

FOREIGN PATENT DOCUMENTS

| | | |
|---|---|---|
| DE | 112013004825 T5 | 9/2015 |
| EP | 2662600 A1 | 11/2013 |

* cited by examiner

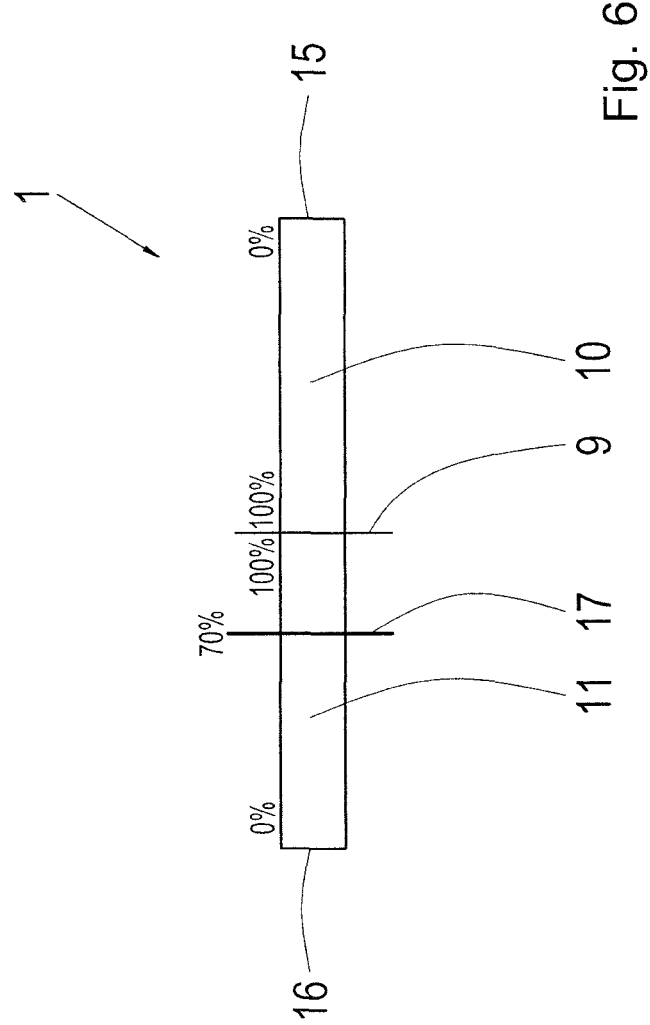

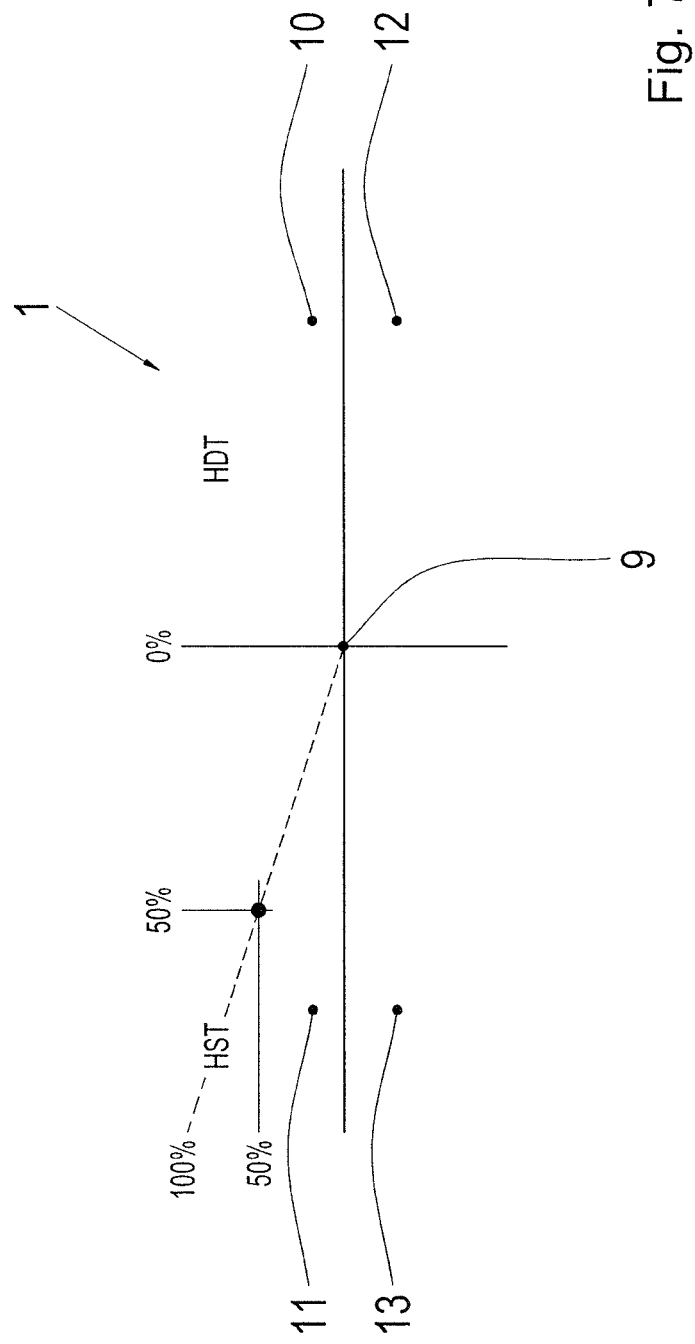

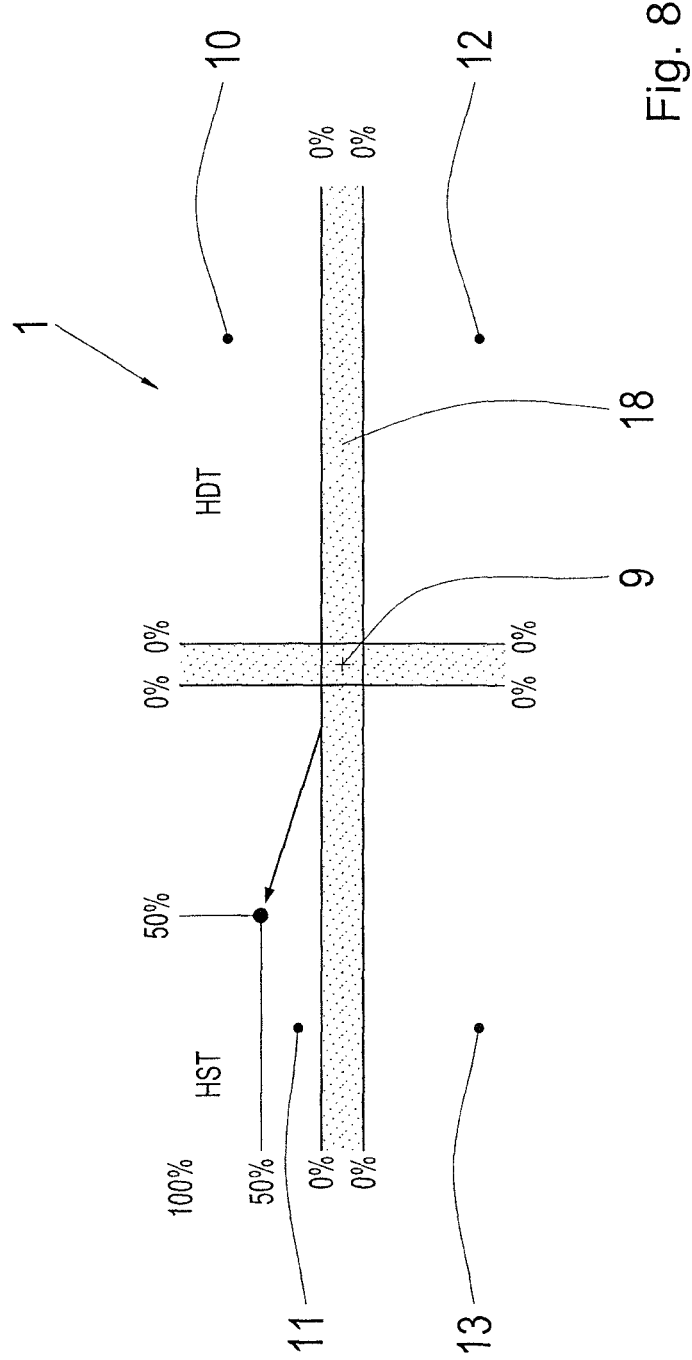

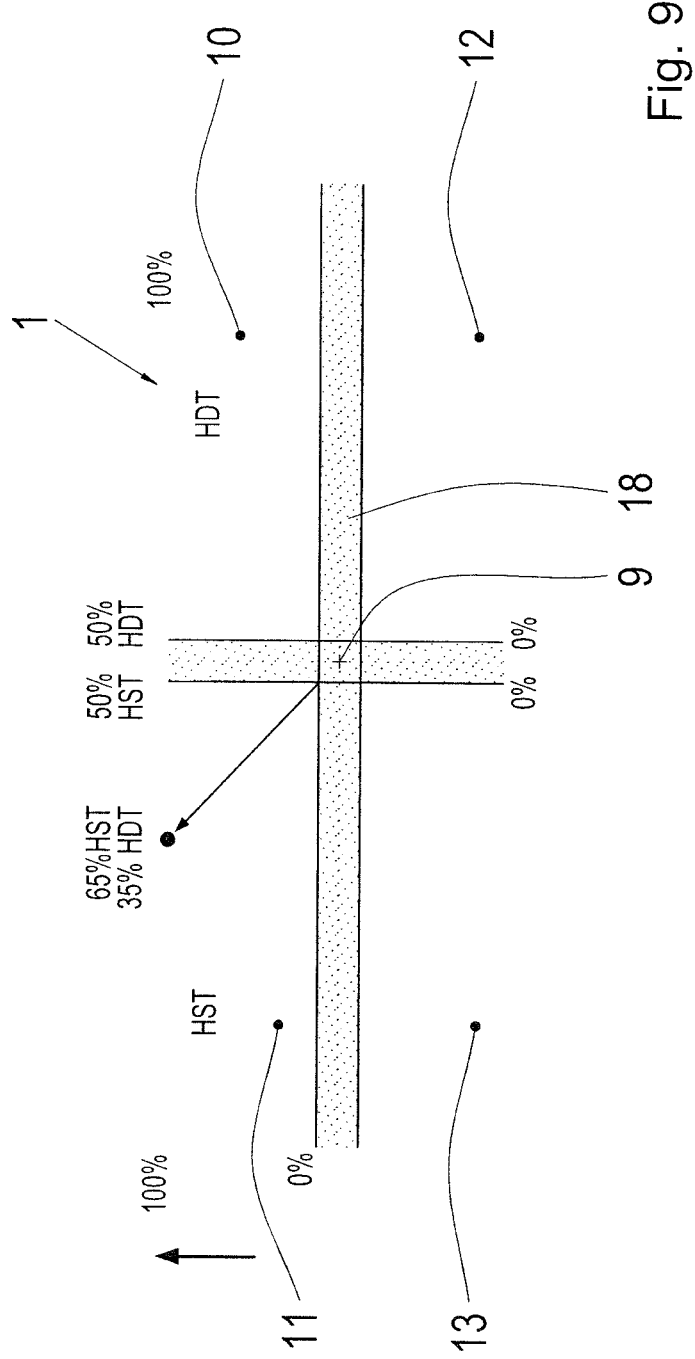

CONTROL DEVICE FOR AN INFINITE HYDROSTATIC MECHANICAL POWER SPLIT TRANSMISSION

This application claims priority from German Application Ser. No. 10 2016 218 404.0 filed Sep. 26, 2016

FIELD OF THE INVENTION

The invention relates to a control method for a continuously variable hydrostatic mechanical power-split transmission.

BACKGROUND OF THE INVENTION

Power-split transmissions of this type are used for example in working machines such as wheel loaders and dumpers. It is also possible, however, to use such transmissions in trucks or passenger cars.

DE 10356462 A1 discloses a control method for a motor vehicle with an electric motor, wherein first, by way of inputs via an on-board computer, a transmission characteristic also known as a Transmission Mode is selected, and thereafter, by way of a further selector lever, parameters of the transmission are varied, these parameters consisting of a ratio of traction force to speed.

These parameters are also often referred to as the Relationship Contour. The driver therefore has first to select the particular transmission characteristic, which can for example be the characteristic of a hydrodynamic change-speed transmission or a manually shifted transmission, and thereafter the driver must additionally select the ratio of traction force to speed by way of a further input switch.

U.S. Pat. No. 8,843,285 B2 discloses a motor vehicle with an electric motor, which, as in DE 10356462 A1, selects a transmission characteristic or Transmission Mode by means of a first switch, in order then, after that, to select the traction force to speed ratio by way of a second switch. Thus, the driver first selects whether the vehicle is to behave as a hydrodynamic vehicle or as a hydrostatic vehicle, in order then to select the ratio of traction force to speed.

SUMMARY OF THE INVENTION

The purpose of the present invention is to enable an operator of a vehicle with a hydrostatic mechanical power-split transmission to operate the vehicle with various transmission characteristics in a simple manner.

This objective is achieved by a method for controlling the transmission ratio of the continuously variable transmission, which method also includes the characterizing features of the principal claim.

According to the invention, the device comprises an input switch which can be shifted to a number of selected positions. Depending on the position of the input switch, the corresponding pressure curve is selected from a large number of previously stored pressure curves. Since the transmission is not an electrical transmission but a hydrostatic mechanical power-split transmission, as the pressure curve it is not the ratio of the direct traction force to the vehicle's speed that is used, but rather, as pressure curves values of the maximum pressure of the hydrostatic unit or the maximum pressure difference of the hydrostatic unit and values of the reciprocal gear ratio of the transmission are stored. It is true that these values correspond approximately to the actual traction force and the actual speed of the vehicle, but by using the maximum pressure the differences in efficiency in the different power flows in the various driving ranges of the power-split transmission are better taken into account. In addition, when the maximum pressure is used an inexpensive sensor system can be employed, by means of which the magnitudes used for controlling and regulating the hydrostat can be measured. To measure the traction force directly, it would be necessary to use a torque sensor system at the drive output, which would be considerably more expensive.

Particularly with working machines such as wheel loaders or dumpers, hydrostatic mechanical power-split transmissions having a hydrostatic power branch and a mechanical power branch and with a number of driving ranges are used. So that the driver can in a simple manner control a plurality of transmission characteristics, a single input switch is used by means of which the driver can directly select the appropriate pressure curve consisting of values of the maximum pressure for reciprocal gear ratios. For this he needs no further, additional input switch, and for the driver this considerably simplifies the operation. Particularly with wheel loaders the driver needs a vehicle having a transmission characteristic that can be operated as with a purely hydrostatic transmission, and a vehicle having a transmission characteristic that can be operated as with a purely hydrodynamic transmission. For this the present invention uses a single input switch which can be moved from a central position in two directions. The input switch can be in the form of a rotary switch, a sliding switch or a touch pad, such that the touch pad can be designed as a two-dimensional sliding switch. Starting from a central position the input switch can be moved in a first direction and depending on how far the input switch is moved in the first direction, the switch emits a corresponding signal. This signal can for example be a numerical value for each switch position. Depending on the numerical value, a corresponding pressure curve is selected from a plurality of stored pressure curves. Throughout the description that follows, pressure curves correspond to the previously defined high-pressure curves consisting of values of the maximum pressure and the reciprocal gear ratio. Thus, the driver only has to select a single position using a single input switch in order to obtain the desired transmission characteristic in the vehicle. For example, if the input switch is a rotary switch, then its rotational angle in degrees is coded as a discrete number. In the transmission control system that discrete number corresponds to a particular pressure curve, which is thereby selected. In accordance with the pressure curve selected, having regard to the current reciprocal gear ratio the stored maximum pressure value is selected. This pressure value is now the maximum permitted pressure in the hydrostat.

If the input switch is in the form of a rotary switch with four quadrants, then it is possible to assign each respective quadrant to a corresponding transmission characteristic. Here too, however, the driver does not need any additional switch, but rather, the corresponding pressure curve is selected directly from the rotational angle. Thus the transmission can be operated in a simple manner, such that the direct traction force is not controlled by the speed but instead the maximum pressure is controlled by way of the reciprocal gear ratio, whereby the direct efficiency can be better processed. Thus it is not the traction force, but rather, the maximum pressure which is limited whereby the characteristic of the hydrostat and its lifetime can be better dealt with.

BRIEF DESCRIPTION OF THE DRAWINGS

Further features emerge from the descriptions of the figures, which show:

FIG. 6: A sliding switch for the corresponding selection of the pressure curve, FIG. 7: A touch pad with the corresponding selection of the pressure curve, FIG. 8: A touch pad with a dead band zone, and FIG. 9: A touch pad with a dead band zone for selecting a corresponding pressure curve.

DETAILED DESCRIPTION OF THE PREFERRED EMBODIMENTS

FIG. 1

Figure 1:
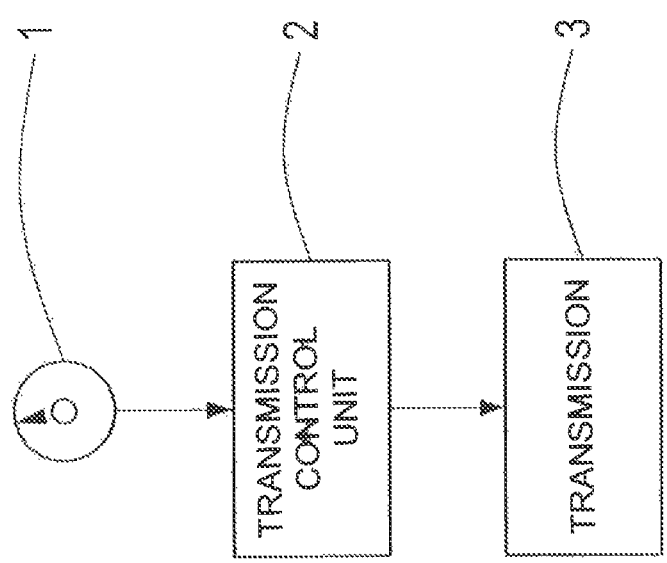
FIG. 1: A sequence diagram of the control of the transmission.
Figure 2:
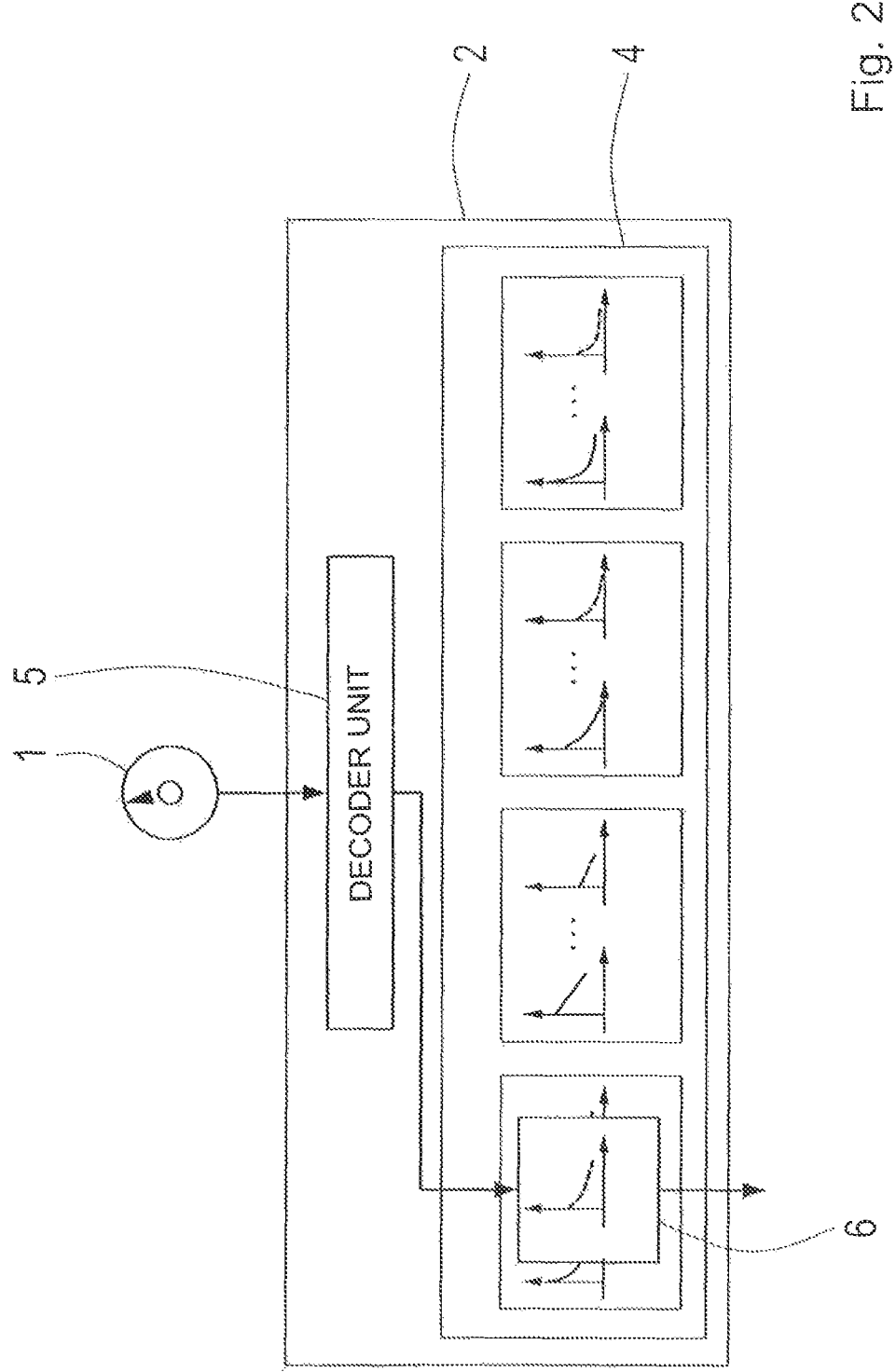
FIG. 2: A sequence diagram for the selection of the pressure curve.

With the input switch 1 a driver of the vehicle selects a particular position. The signal produced by the input switch 1, which can for example be a rotational angle, but which can also be output in encoded degrees or as a discrete number, is passed on to a transmission control unit 2. From a large number of pressure curves the transmission control unit 2 selects the pressure curve that corresponds to the signal. This pressure curve, in the present case also called the maximum pressure curve, is stored together with the reciprocal gear ratio. In correspondence with the pressure curve selected, for the current reciprocal gear ratio the stored maximum pressure value is selected. This maximum pressure value is now the maximum pressure allowed in the hydrostat. In that way the maximum high pressure in the transmission is limited. By virtue of this maximum pressure limitation, the vehicle can be operated in such manner that on slippery ground the drive wheels no longer undergo wheel-spin. The pressure curves are stored in such manner that the farther the input switch 1 is rotated, the more the maximum pressure is limited. For example, if the drive wheels are spinning, the driver must turn the input switch 1 farther in the previous rotational direction in order to select a new pressure curve which limits the maximum pressure still more. Thus, with a single input device the driver can operate the vehicle in a simple manner. In that the maximum pressure is used and not the traction force, efficiency differences in the individual driving ranges can be better taken into account. The fact that the traction force is not influenced directly by the switch has no negative consequences for the driver.

FIG. 2

By way of the input switch 1 the driver communicates a corresponding driver's wish to the transmission control unit 2. This signal is decoded in the decoder unit 5 and used directly in the selector unit of the traction force selection characteristic 4 to select the corresponding pressure curve. The pressure curve is a fixed relationship of the maximum pressure as a function of the reciprocal gear ratio. The transmission control unit then senses the reciprocal gear ratio and with reference to the pressure curve determines a maximum pressure directly. Depending on the position of the input switch 1, in the selector unit of the transmission characteristic 4 a hydrodynamic traction force characteristic or a hydrostatic traction force characteristic is selected. This selected maximum pressure curve 6 then controls the maximum pressure in the closed circuit in the hydrostatic mechanical power-split transmission as a function of the reciprocal transmission gear ratio.

FIGS. 3; 3A

Figure 3A:
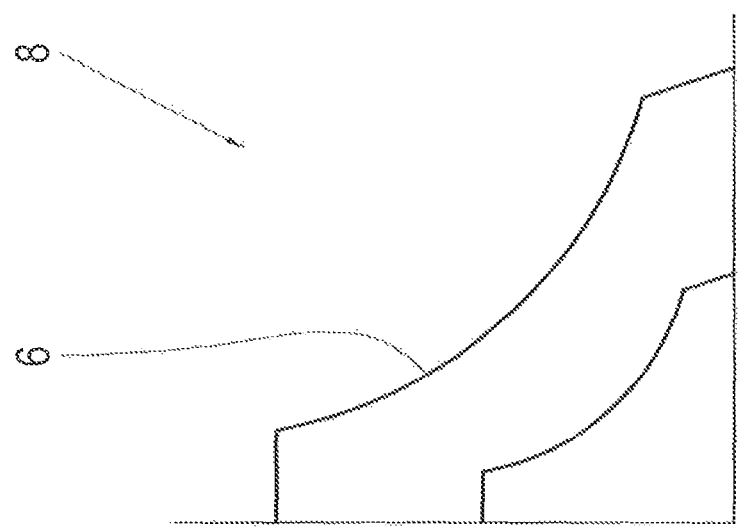
FIG. 3, 3A: Pressure curves of a hydrostatic and of a hydrodynamic drive.
Figure 3:
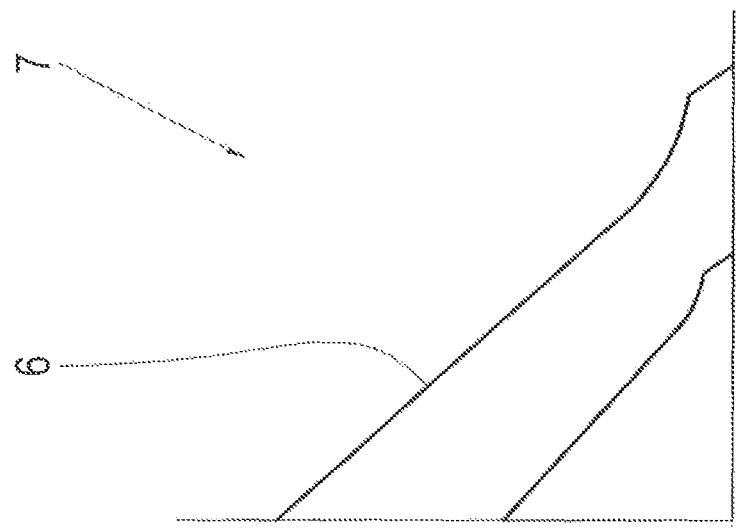

Diagram 7 of FIG. 3 shows a number of example maximum pressure curves 6, such that the maximum pressure curves 6 in diagram 7 represent a linear relationship between the maximum pressure in the closed circuit in the hydrostatic mechanical power-split transmission and the reciprocal gear ratio. This behavior is often found in transmissions with a hydrodynamic torque converter. The maximum pressure is plotted up the ordinate and the reciprocal gear ratio along the abscissa. In diagram 8 of FIG. 3A the maximum pressure curve 6 shows the behavior of a hydrostatic transmission, and in this case the maximum pressure curve 6 pictures a hyperbolic relationship between the maximum pressure and the reciprocal gear ratio. Depending on the position of the input switch, a maximum pressure curve 6 with the behavior of the maximum pressure curve from diagram 7 or from diagram 8 is used. Thus, the vehicle has the characteristic either of a transmission with a hydrodynamic torque converter or a hydrostatic transmission. From the choice expressed by means of the input switch exactly one fixed relationship of the maximum pressure as a function of the reciprocal gear ratio is selected. Consequently there is no need for the further steps of the prior art, in which first a further input switch has to be actuated and then, from these two signals, traction force and torque signals have to be calculated. In that the maximum pressure is selected immediately, considerably less computing power is needed and the control signal for the hydrostatic unit is obtained more rapidly, whereby the spontaneity is increased. Likewise the maximum pressure is taken into account directly, whereby the efficiency differences with a different power flow in the power-split transmission in the first and second driving ranges can be taken into account. In addition the use of the pressure brings the advantage that an inexpensive sensor system can be used for control and regulating the hydrostat. Consequently a costly sensor system for detecting the torque at the drive output of the transmission is not needed. According to the invention, with reference to the maximum pressure curve 6 the oil volumes in the hydrostatic motor and in the hydrostatic pump are varied exactly as required to produce the desired maximum pressure. In this case the actual maximum pressure is determined first and compared with the maximum pressure with reference to the maximum pressure curve 6. The oil delivery volume in the hydrostatic pump is adapted so that, on the one hand, there is no excess pressure in the hydrostat and, on the other hand, the maximum possible torque is always provided according to the driver's wishes. The variation of the pump delivery volume takes place in that by means of a control current, the hydraulic adjustment system sets the swivel angle of the pumping unit to the target value.

FIG. 4

The input switch 1 can be designed such that it has a basic position 9 on one side of which there is a first range 10, a second range 11, and following on from these a third range 12 and a fourth range 13. The first range 10 can for example have a characteristic such that the vehicle reacts as a hydrodynamic vehicle. The second range 11 can be designed such that the vehicle acts as a hydrostatic vehicle. In the third range 12 and the fourth range 13 other characteristics can be stored, but it is also possible for the third range 12 and the fourth range 13 to be designed as mixed forms between a hydrostatic transmission characteristic and a hydrodynamic transmission characteristic. Thus if the input switch 1, which is designed as a rotary switch, is turned to the left, then a hydrostatic transmission characteristic is selected. The farther the rotary switch is turned to the left, the more the maximum pressure is scaled down. In other words, maximum pressure curves are used in which the maximum pressure is more strictly limited. Accordingly, in the basic position 9 the maximum pressure is not limited at all and at the end of the second range 11 the maximum pressure is limited, for example, by 90%. In this way the driver, by turning the rotary switch farther to the left, can further reduce the drive power of the vehicle in the event that on muddy ground the vehicle's wheels are slipping. By turning the rotary switch farther to the left the propulsion force is reduced further, so the driver turns the rotary switch to the left until the wheels are no longer slipping. Turning the rotary switch from the basic position 9 to the right causes the vehicle to react as a vehicle with a hydrodynamic torque converter. The farther the rotary switch is turned to the right, the more the propulsion force of the vehicle is scaled down. At the end of the first range 10 the propulsion force amounts for example to 10%. If the rotary switch is turned to the second basic position 14, then a choice can be made between the transmission characteristics in the third range 12 and in the fourth range 13. In this case the propulsion force is again reduced more, the more the rotary switch is turned away from the basic position 14. Thus, at the range boundary 15 and at the range boundary 16 the rotary switch always produces the greatest propulsion force reduction.

FIG. 5

As an example the rotary switch 1, also called the input switch 1, is moved to a value in the second range 11 at which the transmission control system selects a maximum pressure curve with which the transmission characteristic causes the vehicle to act as a hydrostatic vehicle and the vehicle has a maximum propulsion force of 70%. For this, the input switch 1 detects its position and emits an assigned numerical value for it. The numerical value then passes to the transmission control system. In a rotational angle decoder unit the numerical value communicated is assigned to a maximum pressure curve. This, for example, could be the maximum pressure curve 2. Thereafter, the curve is selected from the large number of permanently stored maximum pressure curves. The maximum pressure curves are stored in relation to the reciprocal gear ratio. In accordance with the curve chosen the stored maximum pressure for the current reciprocal gear ratio is selected. This maximum pressure value is now the maximum pressure allowed in the hydrostat.

FIG. 6

Figure 4:
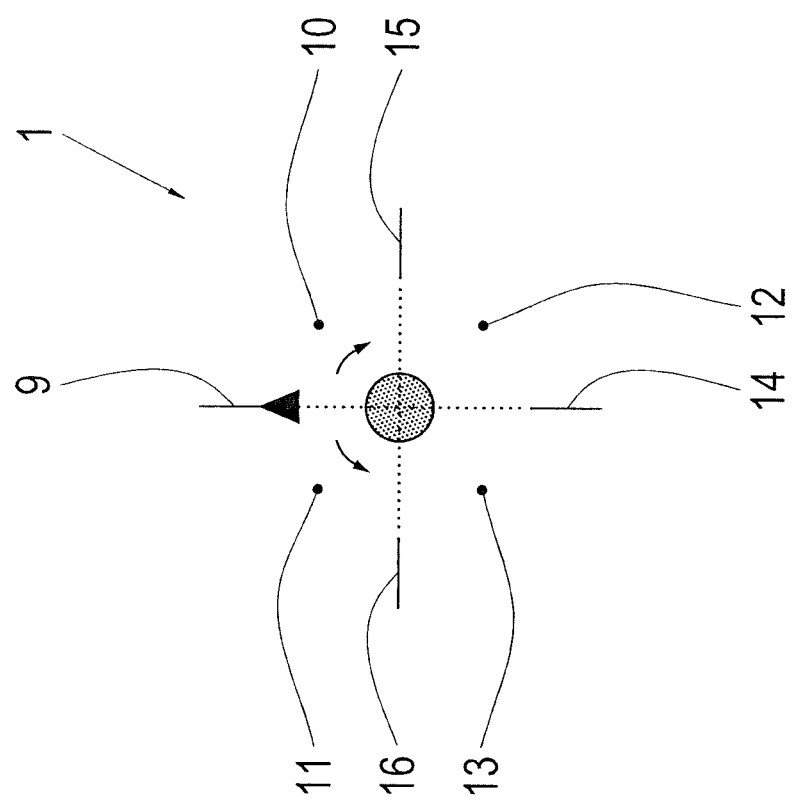
FIG. 4: A rotary switch in the initial position.
Figure 5:
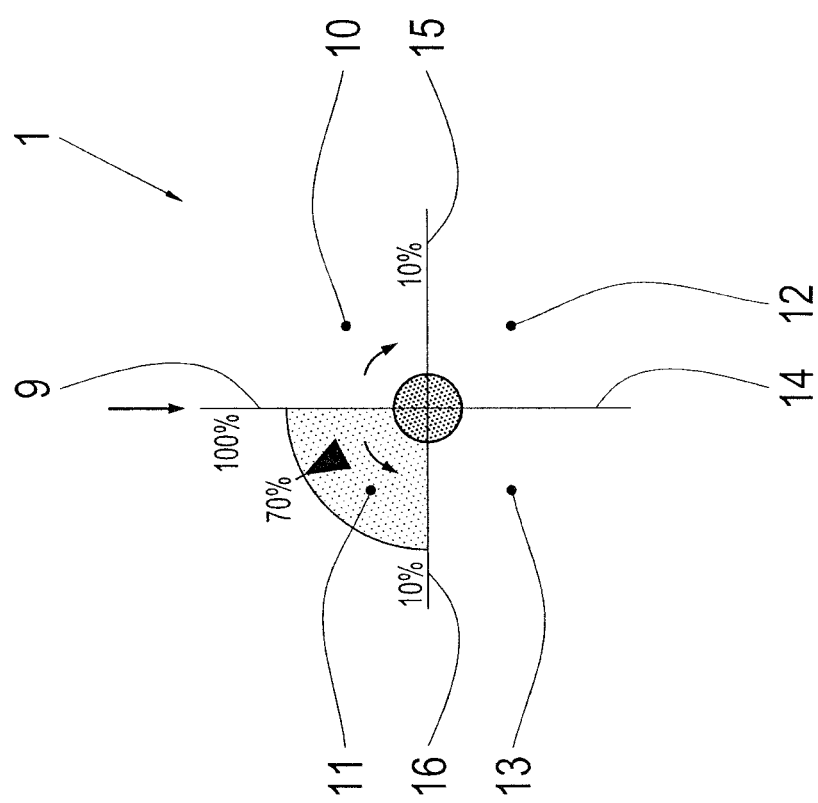
FIG. 5: A rotary switch for selecting the corresponding pressure curve.

Alternatively to the input switch 1 in the form of a rotary switch as in FIGS. 4 and 5, the input switch 1 can also be designed as a sliding switch in which the basic position 9 can be located in the middle. It is also possible, however, for the basic position 9 not to be arranged centrally. By sliding the switch away from the basic position, either into the first range 10 or into the second range 11, on the one hand at the same time the transmission characteristic can be chosen as a hydrodynamic or a hydrostatic transmission and also the propulsion can be limited by restricting the maximum pressure. The first range 10 can be chosen as the hydrodynamic range and the second range 11 as the hydrostatic range. In the basic position 9 the maximum pressure is not limited. At the range boundary 15 and at the range boundary 16 the maximum pressure is fully limited. It is also possible to limit the maximum pressure only partially at the range boundaries 15 and 16. For example, if the sliding switch is pushed to position 17, the input switch 1 emits a numerical value to the decoder unit which then, in the transmission control system, selects a hydrostatic curve by virtue of which the maximum pressure is limited by 30%. Thereafter, with reference to the gear ratio set, the transmission control system controls the maximum pressure by changing the pump delivery volume of the pump in such manner that a maximum pressure of 70% is reached.

If a touch pad is used as the input switch 1, the touch pad can be divided into a first range 10, a second range 11, a third range 12 and a fourth range 13. The basic position is at the center. The four unsealed modes are at the corners of the touch pad. The farther the basic position 9 is displaced toward a corner, the less severely is the maximum pressure of the mode selected by the quadrant scaled down. Thus, a displacement takes place from the basic position 9 to the corner and therefore along the quadrant diagonal. Here too it is possible to assign a hydrodynamic transmission characteristic to the first range 10 and a hydrostatic transmission characteristic to the second range 11. The ranges 12 and 13 can correspond to mixed forms or to completely different transmission characteristics.

FIG. 8

The touch pad in FIG. 8 corresponds to the touch pad of FIG. 7, but the touch pad of FIG. 8 has in addition a so-termed dead band 18, within which no selection or displacement takes place. This makes it possible to achieve better separation of the various transmission characteristics.

FIG. 9

The touch pad in FIG. 9 corresponds to the touch pad of FIG. 8 with the dead band 18, but in the touch pad of FIG. 9 a displacement can take place not exclusively along the diagonals, but any arbitrary displacement within the quadrant is possible. In this case a displacement along the abscissa can be made, which specifies a scaling, and at the same time a displacement on the ordinate can be carried out, which gives rise to a mixture of the two different transmission characteristics. In that way a mixed mode of different transmission characteristics can already be selected within the quadrants. After the selection, the maximum pressure curve stored in the transmission control unit is again chosen and applied.

INDEXES

1 Input switch
2 Transmission control unit
3 Transmission
4 Selector unit of the transmission characteristic
5 Decoder unit
6 Maximum pressure curve
7 Diagram
8 Diagram
9 Basic position
10 First range
11 Second range
12 Third range
13 Fourth range
14 Second basic position
15 Boundary of range
16 Boundary of range
17 Position
18 Dead band

The invention claimed is:

1. A device for controlling a hydrostatic mechanical power-split transmission with a continuously adjustable gear ratio such that by an input switch the transmission being controllable in such manner that the transmission shows different operating behaviors, wherein the input switch has a plurality of positions, each position is associated with a maximum pressure curve which is one of a plurality of stored maximum pressure curves, and each of the maximum pressure curves comprises values for a maximum pressure of a hydrostatic unit of the transmission and reciprocal gear ratio values of the transmission.

2. The device according to claim 1, wherein the maximum pressure is determined as a function of the reciprocal gear ratio.

3. The device according to claim 1, wherein a control unit determines a current reciprocal gear ratio and, with reference to the reciprocal gear ratio and the maximum pressure curve selected, determines the maximum pressure, and the control unit then controls the transmission in such manner that the maximum pressure is not exceeded.

4. The device according to claim 1, wherein the input switch is in a form of a rotary switch, a sliding switch or a touch pad, a fixed numerical value is assigned to every position of the rotary switch, the sliding switch or the touch pad, and by a decoder unit each of the maximum pressure curves is associated with one of the fixed numerical values.

5. The device according to claim 1, wherein the input switch has a central position from which at least a first range and a second range are selected, such that in the first range maximum pressure curves with a substantially linear relationship between the maximum pressure and the reciprocal gear ratio are selectable, and in a second range maximum pressure curves with a substantially hyperbolic relationship between the maximum pressure and the reciprocal gear ratio are selectable.

6. A method of operating a continuously adjustable, hydrostatic mechanical power-split transmission such that by an input switch the transmission is controlled in such manner that the transmission shows different operating behaviors, the method comprising:

selecting a single position, via the input switch, from a plurality of positions, associating one pressure curve, out of a plurality of stored pressure curves, with each position, defining each pressure curve based on values of a maximum pressure of a hydrostatic unit of the transmission and values of a reciprocal gear ratio of the transmission.

7. The method according to claim 6, further comprising determining the maximum pressure as a function of the reciprocal gear ratio.

8. The method according to claim 6, further comprising determining, via a control unit, a current reciprocal gear ratio and, with reference to the reciprocal gear ratio and the maximum pressure curve selected, determining the maximum pressure, and controlling, via the control unit, the transmission in such manner that the maximum pressure is not exceeded.

9. The method according to claim 6, further comprising assigning a fixed numerical value, via the input switch, to every position of the input switch, and the input switch is in a form of a rotary switch, a sliding switch or a touch pad, selecting a numerical value, and selecting, via a decoder unit, a maximum pressure curve.

10. The method according to claim 6, further comprising selecting a point, via the input switch, within a range, extending the range from a middle position from which at least a first range and a second range are selectable, and associating with the first range maximum pressure curves with a substantially linear relationship between the maximum pressure and the reciprocal gear ratio, while associating with the second range maximum pressure curves with a substantially hyperbolic relationship between the maximum pressure and the reciprocal gear ratio.

11. The method according to claim 6, further comprising selecting, via an accelerator pedal, individual operating points of the maximum pressure curve.

\* \* \* \* \*